United States Patent
Haas, Jr. et al.

(10) Patent No.: US 10,447,383 B1
(45) Date of Patent: Oct. 15, 2019

(54) COLLABORATIVE SMALL SATELLITES

(71) Applicant: BAE SYSTEMS Information and Electronic Systems Integration Inc., Nashua, NH (US)

(72) Inventors: Franklin M. Haas, Jr., Hamilton, VA (US); Larry D. Gunn, Bristow, VA (US); John P. Hogan, Lexington, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/182,828

(22) Filed: Nov. 7, 2018

(51) Int. Cl.
*H04B 7/185* (2006.01)
*B64G 1/10* (2006.01)
*G01C 21/00* (2006.01)

(52) U.S. Cl.
CPC ....... *H04B 7/18521* (2013.01); *B64G 1/1007* (2013.01); *B64G 1/1085* (2013.01); *H04B 7/18515* (2013.01); *G01C 21/005* (2013.01)

(58) Field of Classification Search
CPC .......... H04B 7/185–195; B64G 1/1007–1085; G01C 21/005
See application file for complete search history.

(56) References Cited

U.S. PATENT DOCUMENTS

| 6,198,907 B1 * | 3/2001 | Torkington | H04B 7/18541 455/12.1 |
| 2015/0207562 A1 * | 7/2015 | Brumley, II | H04B 10/118 398/125 |

* cited by examiner

*Primary Examiner* — Raymond S Dean
(74) *Attorney, Agent, or Firm* — Davis & Bujold, PLLC (57) ABSTRACT

The system and method of using at least one constellation of small satellites to provide collaborative, tactical intelligence in a space-based system. The low latency of the system provides for actions to be taken within an adversary's decision window. The multi-domain system provides for the use of various sensors and payloads to provide real-time, multi-INT information to users, whether commercial or military in nature.

8 Claims, 5 Drawing Sheets

COLLABORATIVE SMALL SATELLITES

FIELD OF THE DISCLOSURE

The present disclosure relates to activity based intelligence and more particularly to a real-time, tactical, spaced-based activity based intelligence system.

BACKGROUND OF THE DISCLOSURE

The U.S. Government relies on space systems to provide global intelligence, surveillance, and reconnaissance (ISR), communications, and positioning, navigation, and timing (PNT) services for the Department of Defense (DoD), intelligence communities (IC), and civilian agencies. Current space systems are, in general, not resilient to contested environments and cannot be quickly replaced due to their high cost and long development timelines. Because the various ISR space systems are not integrated together (i.e., they are stove-piped), they rely on ground-based processing of the data, which adds significant latency to the information gleaned from the spacecraft such that in many instances it is not tactically relevant, but only useful for use strategically.

Wherefore it is an object of the present disclosure to overcome the above-mentioned shortcomings and drawbacks associated with the conventional activity based intelligence (ABI).

SUMMARY OF THE DISCLOSURE

One aspect of the present disclosure is a space-based activity based intelligence system, comprising: at least one constellation of low earth orbit satellites, wherein the satellites are connected via an inter-satellite crosslink network, the satellites comprise imaging, radio frequency (RF), and processing payloads; onboard processing algorithms, including multiple intelligence (multi-INT) activity based intelligence (ABI) algorithms that use machine learning to discover anomalies in patterns of life and predict future events; and an onboard autonomous multi-vehicle mission control system; a ground based segment comprising a payload command and control module and a constellation command and control module; a payload specific user segment comprising user equipment; and a payload abstracted user segment comprising instruction for one or more mission applications, the space-based activity based intelligence system being in communication with a customer network; the at least one constellation of low earth orbit satellites being configured to process space-based multi-INT ABI removing the latency of ground level processing, thereby providing real-time actionable intelligence.

One embodiment of the space-based activity based intelligence system is wherein the at least one constellation of low earth orbit satellites comprises a plurality of constellations of low earth orbit satellites configured to provide additional functions such as communications, positioning, navigation and timing (PNT), electronic warfare, and cyber.

Another embodiment of the space-based activity based intelligence system is wherein user equipment is a communication receiver located on a tank, a plane, or a ship that will use the information gathered by the constellation of satellites using particular payload to take specific actions.

In certain embodiments of the space-based activity based intelligence system, the payload abstracted user segment communicates mission application information to the ground segment, which interprets the information and transfers the commands to the constellation commands. In some embodiments, the payload command and control provides a mission interface to the constellation payloads and the ground segment communicates with the space segment via a space-to-ground communication link.

Another aspect of the present disclosure is a method of space-based activity based intelligence, comprising: connecting at least one constellation of low earth orbit satellites, via an inter-satellite crosslink network, wherein the at least one constellation of low earth orbit satellites comprise an onboard autonomous multi-vehicle mission control system and at least one on-board processor; communicating mission application information to a ground segment, via a payload abstracted user segment acting as command and control for each satellite in the at least one constellation of low earth orbit satellites; collecting data from a plurality of sensors present as payload on the at least one constellation of low earth orbit satellites according to the mission application information; processing multiple intelligence (multi-INT) activity based intelligence (ABI) algorithms with the data from the plurality of sensors via the at least one on-board processor using machine learning to discover anomalies in patterns of life and predict future events; and communicating output from the multi-INT ABI processing via a payload specific user segment for use in real-time actionable intelligence activities.

One embodiment of the method of space-based activity based intelligence is wherein the at least one constellation of low earth orbit satellites comprises a plurality of constellations of low earth orbit satellites configured to provide additional functions such as communications, positioning, navigation and timing (PNT), electronic warfare, and cyber applications.

Another embodiment of the method of space-based activity based intelligence is wherein user equipment comprises a communication receiver located on a tank, a plane, or a ship that will use the information gathered by the constellation of satellites using particular payload to take specific actions.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

One embodiment of the present disclosure is a space-based national security system comprising a dense (>>200) constellation of low earth orbit (LEO) satellites that are connected via an inter-satellite crosslink network. This solution has three primary components: 1) commoditized commercial satellite buses with customized, low-cost imaging, radio frequency (RF), and processing payloads; 2) onboard processing algorithms, including multiple intelligence (multi-INT) activity based intelligence (ABI) algorithms that use machine learning to discover anomalies in patterns of life and predict future events; and an 3) onboard autonomous multi-vehicle mission control system.

The system of the present disclosure is affordable by incorporating commercial technology. A commodity satellite bus with industrial grade payloads, combined with high volume assembly lines, brings the cost of a single satellite to less than $3M. The collaborative system of multiple satellites of the present disclosure generates actionable information in near-real time, which makes it a space-based tactical asset.

In one embodiment of the system of the present disclosure, all radio frequency (RF) and image signal processing, as well as the multi-INT ABI machine learning and autonomous adaptive control are performed in real-time. Multi-INT is the fusion of different types of data collection (e.g., from a multitude of different sensors) to provide a full operating picture for the warfighter. The architecture is scalable to other applications as well. Because the crosslink network provides precision time synchronization, the constellation can host advanced capabilities in communications, electronic warfare, positioning, navigation, timing, and other distributed techniques. In addition to national security applications, the system of this disclosure can be used for detecting illegal fishing, monitoring border control, and other similar applications.

Figure 1:
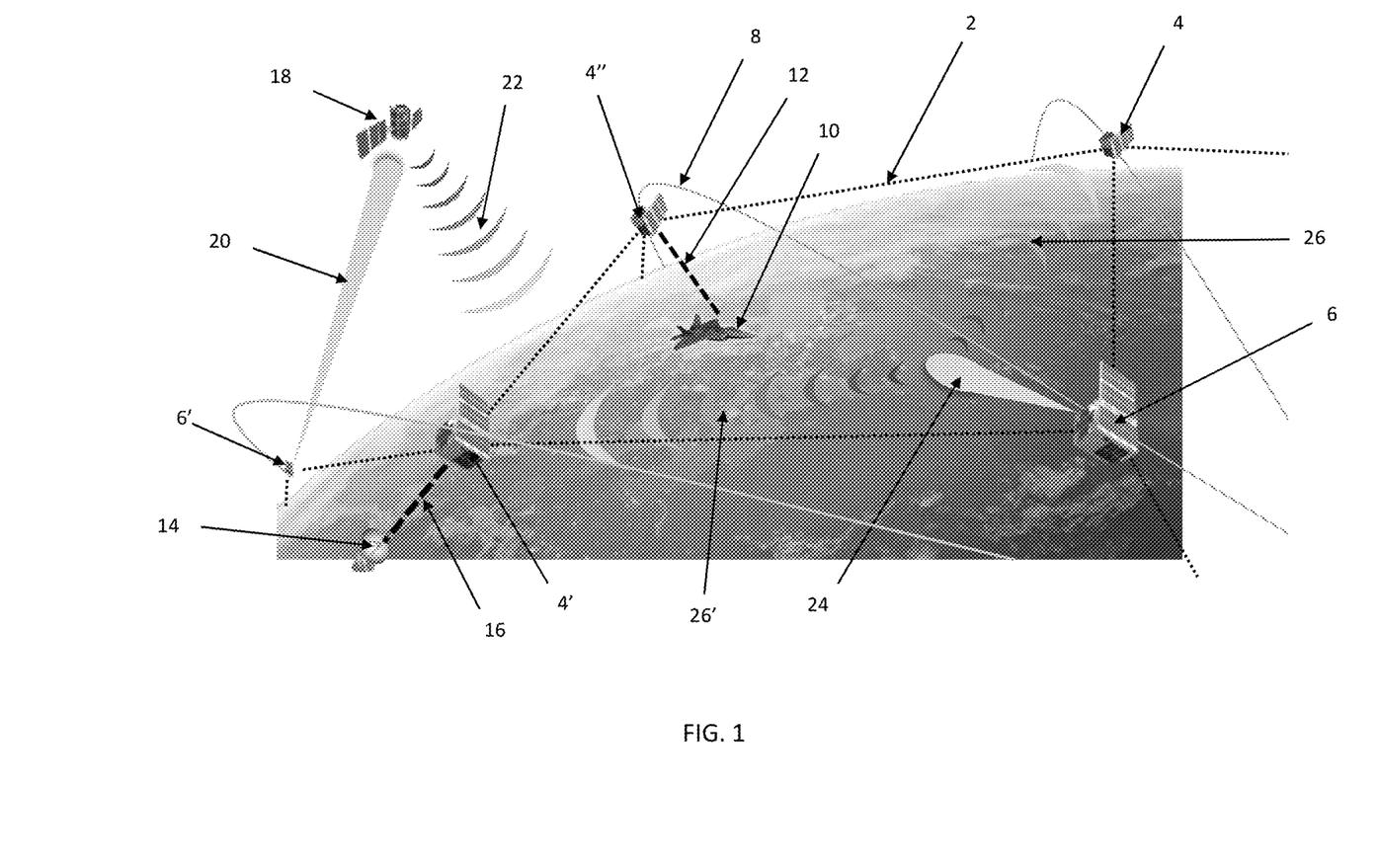
FIG. 1 shows one embodiment of the system of the present disclosure with a collaborative multi-INT satellite constellation.

Referring to FIG. 1, one embodiment of the system of the present disclosure with a collaborative multi-INT satellite constellation is shown. More specifically, an in-space signal processing and ABI inter-satellite cross-link 2 system converts multi-INT data from several different satellites to actionable intelligence. Real-time processing at the sensor level keeps the process within an adversary's decision loop. In other words, rather than dealing with the latency of ground level processing, decisions can be made very quickly while the data is fresh. In certain embodiments, the system comprises a scalable multi-INT small satellite constellation, which leverages high-volume commercial satellite buses for a lower overall system cost. In this embodiment, multiple RF satellites (4, 4', 4") and multiple imaging satellites (6, 6') are present in the multi-INT collaborative constellation system. In one embodiment, the satellites are in orbits 8 and the satellite positions and clock offsets relative to each other are estimated in real time using ranging and timing measurements embedded in the inter-satellite crosslink communication signals 2, enabling a precision common coordinate system and time scale for fusing data collected by each satellite.

Still referring to FIG. 1, a warfighter 10, or other user of the collaborative, real-time data is able to receive the payload and ABI information from the system via some form of communication link 12 including, but not limited, to optical or RF. An autonomous battle management Command and Control (BMC2) 14 (ground and space) keeps the warfighter 10 focused on information, not data. This ability to use space-based intelligence in a tactical manner is a vast improvement over current ground-based systems that may only be used strategically due to their large increase in latency.

In one embodiment of the present disclosure, a customer (whether commercial or military) creates ABI-based models and mission applications. The constellation's command and control center 14 and/or the warfighter 10, or other user, uplinks (12, 16) priorities to the constellation for implementation. The satellites (4, 4', 4", 6, 6') persistently monitor prioritized areas and signals of interest, whether they be ground-based (24, 26, 26') or space-based (20, 22). In some cases, the satellites use EO and/or RF sensors to do so. On-board signal processing detects and attributes features from the EO and/or RF data (20, 22, 24, 26, 26'). Distributed on-board machine learning processes the multi-INT features received via the inter-satellite crosslink and discovers anomalies in relationships and patterns. In some cases, the system autonomously readjusts its data collection posture as a result. The results (e.g. intelligence, surveillance, reconnaissance (ISR), or activity based intelligence (ABI)) are downlinked (12, 16) to data managers 14 (e.g., command and control) and/or warfighters 10, or other users, for further action. In some embodiments, this system is expandable for advanced coherent communications, electronic warfare (EW), and positioning, navigation, and timing (PNT) and the like.

In some cases, the system can be used to monitor ships, trains, and other logistical systems. For example, features extracted from satellite imaging payloads may be correlated with reference models to autonomously detect, identify, and characterize ships entering a port, and then subsequently track those same ships as they leave port on their way to their next destination. In addition, radio frequency emissions from those same ships may also be autonomously detected, identified, characterized, and geolocated by satellite RF receivers, and fused with the corresponding imagery data to increase the level of confidence in the ship association as well as the ship's pattern of life.

Figure 2:
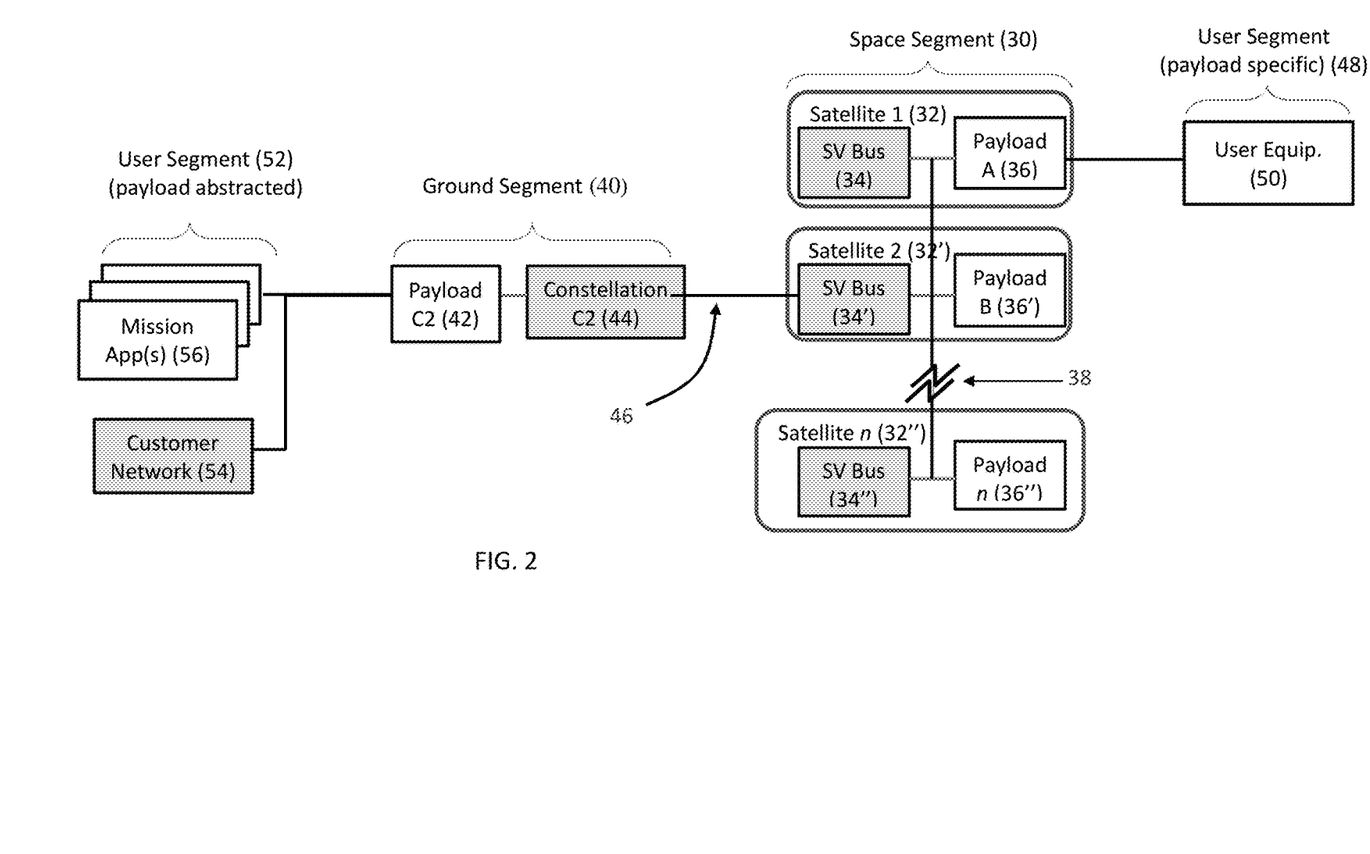
FIG. 2 shows a diagram of one embodiment of the system of the present disclosure with a collaborative multi-INT satellite constellation.

Referring to FIG. 2, a diagram of one embodiment of the system of the present disclosure with a collaborative multi-INT satellite constellation is shown. More specifically, the system comprises a space segment 30, a ground segment 40 and two user segments (48, 52). In some embodiments, the payload specific user segment 48 referes to a warfighter and the user equipment 50 might be located on a tank, a plane, or a ship that will use the specific information gathered by the constellation of satellites using particular payload to take specific actions. In some embodiments, the payload abstracted user segment 52, refers to a customer network such as a commercial or a military customer that develops or utilizes one or more mission applications 56. For example, a military customer might have an ISR, or EW mission, and a commercial customer might have a logistics mission such a tracking and managing the movement of goods.

Still referring to FIG. 2, the payload abstracted user segment 52 communicates mission application information to a ground segment 40, which acts as command and control (C2) for the satellite buses. Within the ground segment 40 there is a constellation bus C2 44 and a payload C2 42. The payload C2 provides the mission interface to the constellation payloads. The ground segment 40 communicates with the space segment 30 via a space-to-ground communication link. In some cases this comprises of RF and or optical signals, or the like.

In another embodiment of the system of the present disclosure, calibration and efficient signal processing is used for converting raw sensor data into features for machine learning. In some cases, a <1 m resolution of structures and vehicles from imaging payloads and a <100 m RF emitter geolocation is possible by exploiting RF phase precision.

A space segment 30 comprises multiple satellites (32, 32', 32") to form a constellation of satellites. In some cases these are low earth orbit (LEO) satellites. Within each satellite there are generally two components. The first component is a bus (34, 34', 34") and the second component is the payload(s) (36, 36', 36"). The bus (34, 34', 34") generally comprises modules for one or more of the following power, thermal control, ground communication, attitude control, propulsion/orbit adjust, position and time, inter-satellite cross-link, command and data handling (C&DH), and the like. The payload (36, 36', 36") comprises modules configured for one or more of the following types of payloads: RF receivers for signals intelligence and similar missions; RF transmitters for PNT, EW, and similar missions; and RF transceivers for communication and similar missions; electro-optical sensors for imaging intelligence; and multi-/hyper-spectral sensors for measurement and signatures intelligence. In some cases, the payloads directly connect to the user segment 18, such as for communications or PNT payloads. Each of the satellites (32, 32', 32") communicate with each other via an inter-satellite crosslink 38, which in some cases is RF or optical, or the like.

In one embodiment of the present disclosure, autonomous ABI processing fuses processed data from multiple sensor payloads across the constellation to form high level actionable information. The low latency in onboard processing allows for real time operations. Autonomous multi-vehicle C2 is distributed across the constellation such that the constellation is resilient to the loss of one or more satellites.

Sensor tasking optimization and/or prioritization across all users (e.g., 100's of space vehicles with potential for 1000's of users/tasks) is a feature of the system of the present disclosure. In some cases, the mission application programming interface (API), which is a software intermediary that allows two applications to talk to each other, abstracts physical system configuration data from user mission data. In one embodiment, coherent inter-satellite cross-link network for in-space analytics is resilient to cyber-attacks. In some embodiments, multi-hop networking (C2 to all satellites when any single satellite is in view of ground station) provides for a robust and low-latency system.

Figure 3:
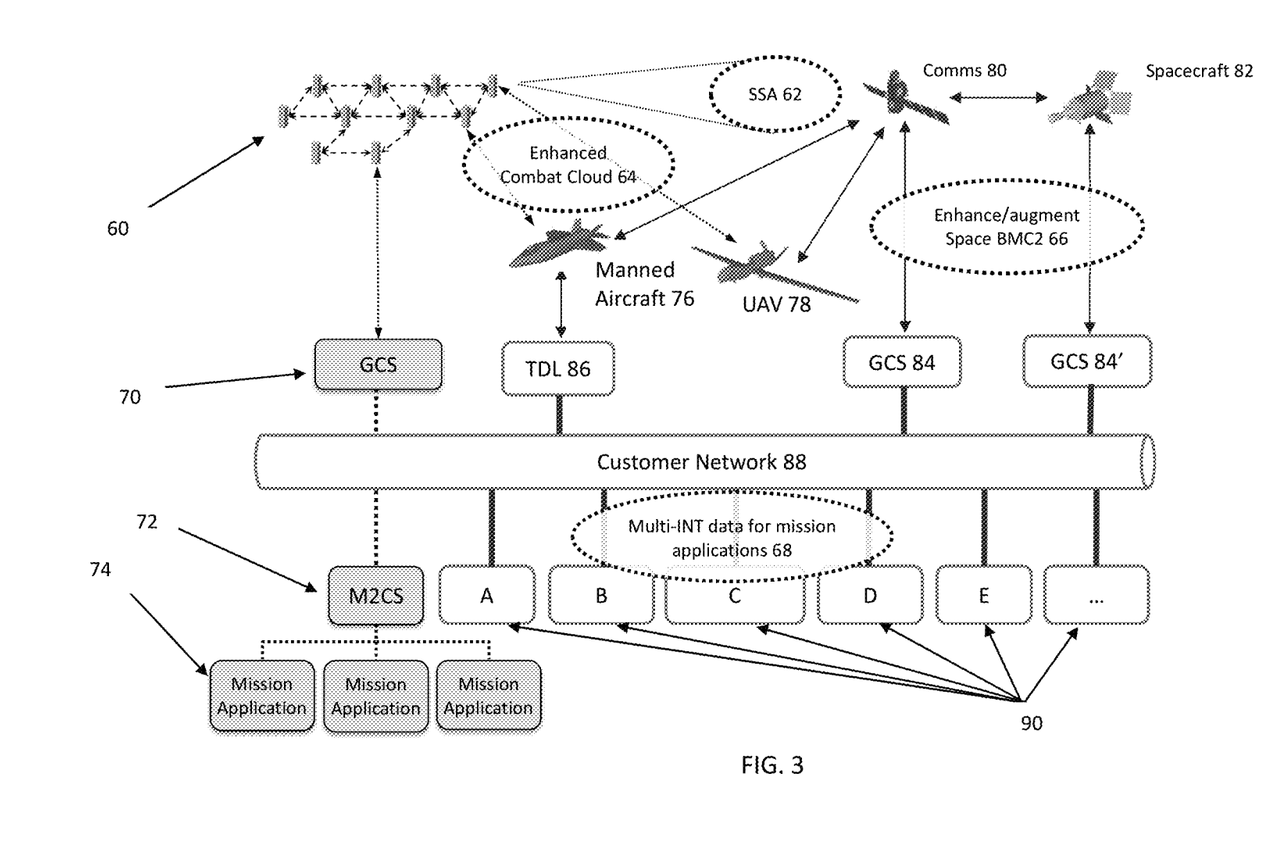
FIG. 3 is a diagrammatic view of one embodiment of the system of the present disclosure.

Referring to FIG. 3, a diagrammatic view of one embodiment of the system of the present disclosure is shown. More specifically, a multi-domain command and control (MDC2) is shown having at least a space component 60 and a ground component (72, 90), where the different domains are in communication with each other via Ground Control Stations (GCS) (70, 84, 84') or Tactical Data Links (TDL) 86, or the like. In one embodiment, the standard ground based system 90 comprises one or more ground-based data fusion centers. In the military context these may include Operations Centers; Intelligence Information Centers; Defense Centers; or the like (A, B, C, D, E, . . . ).

One embodiment of a multi-INT ISR/ABI constellation 60 according to the principles of the present disclosure will work within an enterprise messaging system to provide a low latency, real time space-based situational awareness (SSA) 62. Additionally, the constellation will enhance/augment the Space BMC2 66, Enhance the Combat Cloud 64, and enrich the Multi-INT data for use with mission application 68. The system of the present disclosure will work with the Customer Network 88 and will add a multi-vehicle mission control system (M2CS) 72 to the platform which can implement one or more mission application 74.

Still referring to FIG. 3, a communications satellite 80 will communicate information to/from space craft 82, manned aircraft 76, UAV 78, and the like as well as communication to ground-based operations via GCS 84'. The constellation 60 will also communicate in real-time with the payload specific user segment (e.g., 64, 76, 78) and the payload abstracted user segment (e.g., 70, 72, 74) to provide low latency multi-INT data for mission implementation.

The system of the present disclosure has continuous global coverage to augment current space-based ISR systems and is compatible with planned MDC2 architecture. In some embodiments, sensor data is converted to actionable information on-orbit for timely action. A robust inter-satellite crosslink enables ground access to the entire constellation when only one satellite is in view of a GCS. In other embodiments, a scalable constellation addresses immediate ISR needs 60 (e.g., RF vs. imagery sensors). In some cases, there is a lower cost due to the use of commercial off the shelf small satellites and also this provides for frequent technology refresh.

Figure 4:
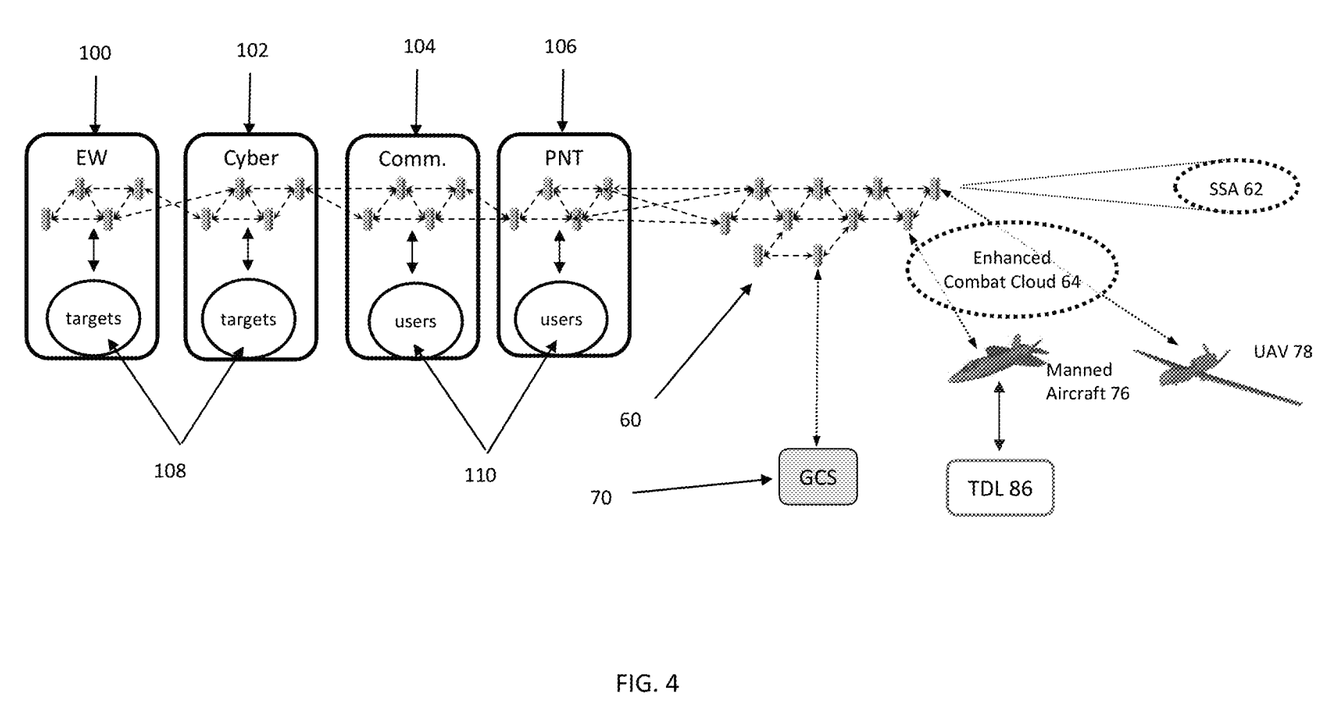
FIG. 4 is a diagrammatic view of another embodiment of the system of the present disclosure.

Referring to FIG. 4, a diagrammatic view of another embodiment of the system of the present disclosure is shown. More specifically, a phased array of satellites can be used for additional active and passive capabilities. In some embodiments, the array can be above and/or below the constellation 60 used for ISR and/or ABI. In one embodiment, additional phased arrays may be used for one or more of the following purposes, electronic warfare (EW) 100 (e.g., RF, optical); cyber 102; high anti-jam (AJ) communications (Comm.) 104; AJ PNT 106; and defensive/offensive space control, or the like. An excerpt of FIG. 3 is also shown for context for how these various constellations, and or phased arrays are integrated into an expanded system. In some embodiments, the expanded system is focused on tracking targets 108, and in some cases the expanded system is focused on user information 110.

In certain embodiments of the system of the present disclosure, machine learning is incorporated in to the robust system. Depending on the particular application, there will be detection of patterns of life, or the like, where depending on the detection of certain behavior an event will be instituted. For example, in a commercial application, the detection that a rail car has arrived at a station would indicate loading or unloading of cargo.

Figure 5:
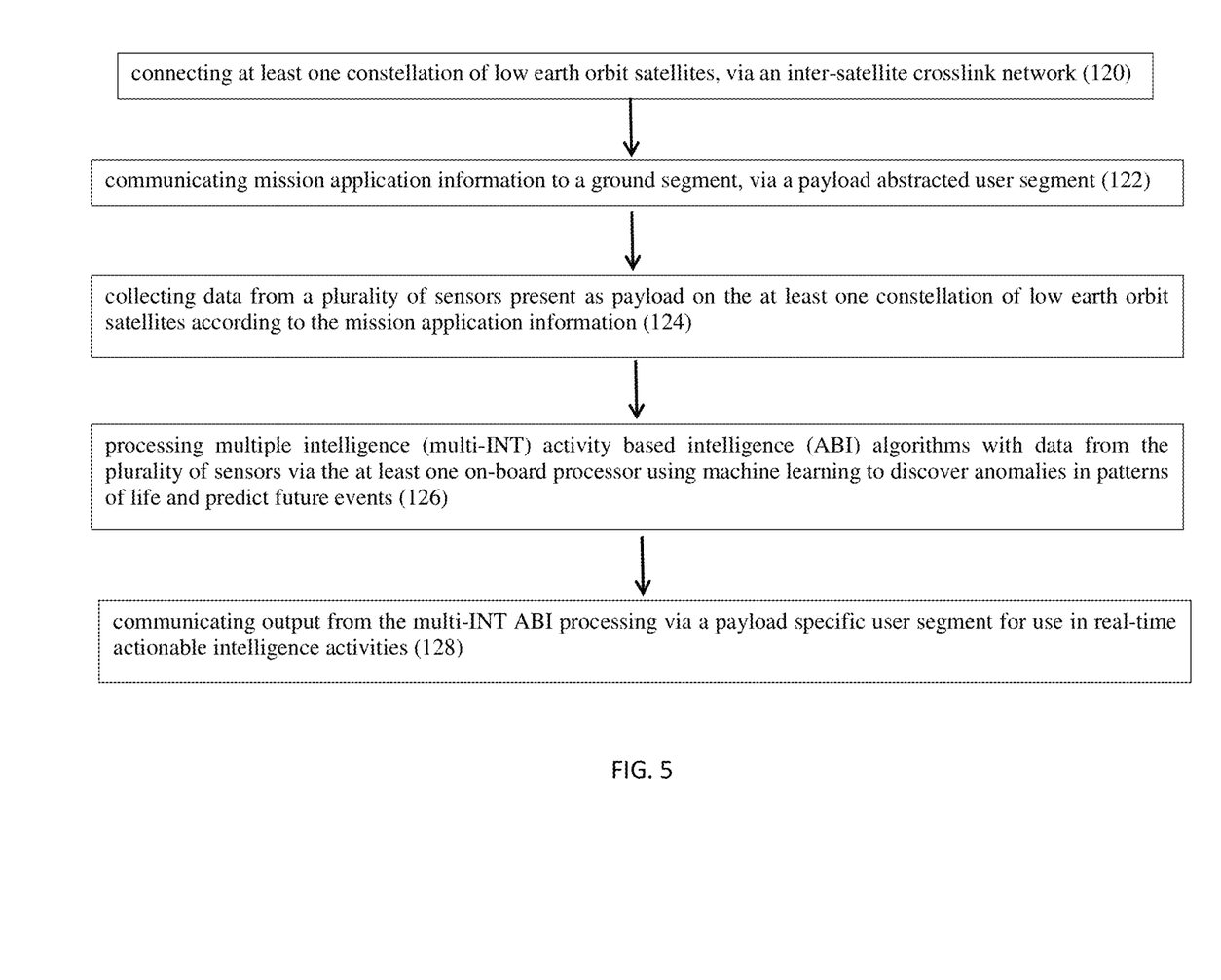
FIG. 5 is a flowchart of one embodiment of a method according to the principles of the present disclosure.

Referring to FIG. 5, a flowchart of one embodiment of a method according to the principles of the present disclosure is shown. More specifically, a method of space-based activity based intelligence provides for real-time actionable intelligence. In one embodiment, at least one constellation of low earth orbit satellites is connected, via an inter-satellite crosslink network, wherein the at least one constellation of low earth orbit satellites comprises an onboard autonomous multi-vehicle mission control system and at least one onboard processor (120). Mission application information is communicated to a ground segment, via a payload abstracted user segment providing instructions for each satellite in the at least one constellation of low earth orbit satellites (122). Data is collected from a plurality of sensors present as payload on the at least one constellation of low earth orbit satellites according to the mission application information (124). Multiple intelligence (multi-INT) activity based intelligence (ABI) algorithms with the data from the plurality of sensors are processed via the at least one on-board processor using machine learning to discover anomalies in patterns of life and predict future events (126). Output from the multi-INT ABI processing is communicated via a payload specific user segment for use in real-time actionable intelligence activities.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A space-based activity based intelligence system, comprising:
　　at least one constellation of low earth orbit satellites, wherein the satellites are connected via an inter-satellite crosslink network, the satellites comprise constellation payloads comprising at least one of imaging payloads, radio frequency (RF) payloads, and processing payloads; onboard processing algorithms, including multiple intelligence (multi-INT) activity based intelligence (ABI) algorithms operating on one or more processors that use machine learning to discover anomalies in patterns of life and predict future events; and an onboard autonomous multi-vehicle mission control system;
　　a ground based segment comprising a payload command and control module and a constellation command and control module;
　　a payload specific user segment comprising user equipment; and
　　a payload abstracted user segment comprising instruction for one or more mission applications, the space-based activity based intelligence system being in communication with a customer network;
　　the at least one constellation of low earth orbit satellites being configured to process the multi-INT ABI algorithms removing a latency of ground level processing, thereby providing real-time actionable intelligence.

2. The space-based activity based intelligence system according to claim 1, wherein the at least one constellation of low earth orbit satellites comprises a plurality of constellations of low earth orbit satellites configured to provide additional functions such as communications, positioning, navigation and timing (PNT), electronic warfare, and cyber.

3. The space-based activity based intelligence system according to claim 1, wherein the user equipment is a communication receiver located on a tank, a plane, or a ship that will use information gathered by the constellation payloads of to take specific actions.

4. The space-based activity based intelligence system according to claim 1, wherein the payload abstracted user segment communicates mission application information to the ground segment, which interprets the mission application information and transfers one or more commands to the constellation command and control module.

5. The space-based activity based intelligence system according to claim 1, wherein the payload command and control provides a mission interface to the constellation payloads and the ground segment communicates with a space segment via a space-to-ground communication link.

6. A method of space-based activity based intelligence, comprising:
　　connecting at least one constellation of low earth orbit satellites, via an inter-satellite crosslink network, wherein the at least one constellation of low earth orbit satellites comprise an onboard autonomous multi-vehicle mission control system and at least one on-board processor;

communicating mission application information to a ground segment, via a payload abstracted user segment acting as command and control for each satellite in the at least one constellation of low earth orbit satellites;

collecting data from a plurality of sensors present as at least one constellation payload on the at least one constellation of low earth orbit satellites according to the mission application information;

processing multiple intelligence (multi-INT) activity based intelligence (ABI) algorithms with the data from the plurality of sensors via the at least one on-board processor using machine learning to discover anomalies in patterns of life and predict future events; and communicating with the at least one constellation of low earth orbit satellites an output from the multi-INT ABI processing via a payload specific user segment thereby removing a latency of ground level processing for use in real-time actionable intelligence activities.

7. The method of space-based activity based intelligence according to claim 6, wherein the at least one constellation of low earth orbit satellites comprises a plurality of constellations of low earth orbit satellites configured to provide additional functions such as communications, positioning, navigation and timing (PNT), electronic warfare, and cyber applications.

8. The method of space-based activity based intelligence according to claim 6, wherein user equipment comprises a communication receiver located on a tank, a plane, or a ship that will use the mission application information gathered by the constellation payload to take specific actions.

* * * * *